Patented Jan. 8, 1935

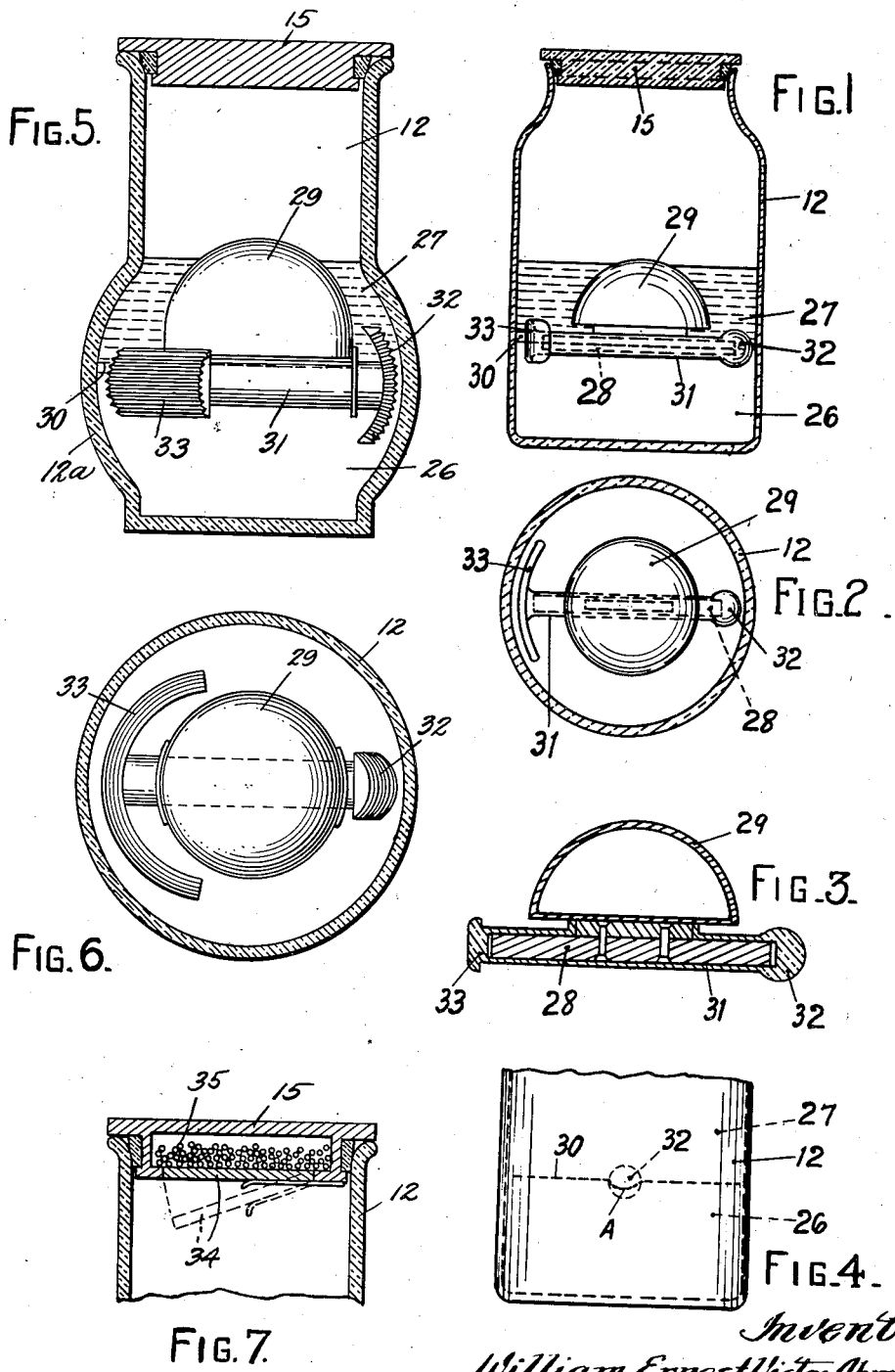

1,987,522

UNITED STATES PATENT OFFICE 1,987,522

BORE HOLE SURVEY APPARATUS

William Ernest Victor Abraham, Khodoung, British India, assignor to The Burmah Oil Company Limited, Glasgow, Scotland, a British corporation Application September 10, 1931, Serial No. 562,021
In Great Britain October 30, 1930

17 Claims. (Cl. 234—5.3)

The object of this invention is a directional inclinometer of the acid-bottle type for recording the directional deviation of a bore-hole from the vertical.

The ordinary acid-bottle inclinometer or inclination recorder only records the angle of deviation of the bore-hole from the vertical by the etching of a line around the inside of the bottle.

The improved deviation recording instrument, in addition to recording the angle of deviation from the vertical by etching a line around the inside of the bottle, also includes a magnet and means whereby the position of the magnet is recorded upon the bottle, thus indicating the direction of the deviation of an inclined bore-hole, provided that magnetic disturbances other than those due to the magnet and to the earth's magneic field can be ignored.

The improved deviation recording instrument comprises an acid-bottle or vessel of glass or other suitable material adapted to be etched by an etching liquid contained within the bottle, and the invention consists in floating a magnet in the plane of an interface formed between the etching liquid and a supernatant liquid and in applying to one pole of the magnet a polar element which is capable of deforming the trace of the liquid interface at the side of the vessel. For this purpose the polar element and the liquids are of such a nature that the polar element has the property of being more readily wetted by one of the liquids than by the other liquid, so that a film of one of the liquids adheres more readily to the polar element than does the other liquid, and thus produces a deformation in the edge of the liquid interface. The polar element is preferably made of a substance which is capable of being more easily wetted by the supernatant liquid than by the etching liquid, and the invention furthermore consists in propelling said polar element towards the side of the bottle by the repellant action between the bottle side and an element carried by the opposite magnet pole. In this manner the polar element propelled towards the side of the bottle deforms the trace of the liquid interface and this deformation is etched on the bottle by the etching liquid, thus producing a permanent record on the bottle in the form of a deformation of the line etched around the inside of the bottle by the etching liquid.

In one manner of carrying out the invention, the acid bottle of glass, contained in a pressure-resistant water-tight non-magnetic shell or outer casing, contains an aqueous solution of hydrofluoric acid or other suitable etching liquid, upon the surface of which floats a liquid such as oil. A bar magnet or magnetic needle is floated in the plane of the acid-oil interface by suspending it from a float of hemispherical, spherical, cylindrical or other suitable shape. The bar magnet is coated or covered with ebonite, gutta-percha or some other substance which will protect the magnet from corrosion by the acid. Applied to or carried by one pole of the magnet is a projecting member, which may for instance be convex, the said member being made of, or coated with, a water-repellant substance which is capable of being wetted by the oil but not by the acid. For this purpose a substance such as ebonite, preferably coated with gutta-percha may be employed. To the other pole of the magnet is applied or attached a larger projecting member of the same water-repellant substance, the said member being of such size and shape that it is more strongly repelled from the side of the bottle than the smaller projection carried at the other end of the magnet. The larger member may for example be in the form of a broad curved piece of a substance such as ebonite, preferably coated with gutta-percha and curved to a radius approximately equal to the radius of the internal lateral surface of the bottle.

In operation, the smaller projection or member is propelled towards the side of the bottle and deforms the trace of the acid-oil interface at this point, thus forming a slight depression in the trace of the acid-oil interface, which depression is etched on the side of the bottle by the acid.

The quantity of oil on the surface of the acid should be sufficient to allow the projections or members carried by the magnet to float in the plane of the acid-oil interface, as illustrated in the accompanying Figs. 1, 4 and 5. Were the magnet to float on the single acid liquid, the projection or members would lie below the surface thereof. The addition of the second supernatant liquid increases the buoyancy force exerted upon the magnet to raise the projections carried thereby so that they intersect the interface at or near their greatest horizontal dimension. No greater accuracy in determining the quantity of oil is required.

If desired, the smaller member carried by the magnet may be so shaped as to produce a more defined or V-shaped depression in the trace of the acid-oil interface. To this end it is preferred to employ a strip of ebonite or like material affixed in a vertical position to the end of the magnet. The strip is preferably convex on its face adjacent to the vessel. In order to resist the tendency of the etching liquid to creep up the polar elements or members, it is preferred to form transverse ribs or grooves across the faces of both members.

The accompanying drawing illustrates the manner in which the invention may be carried into effect, but it is to be understood that the invention is not confined to the specific construction hereinafter described, which is given only as an example.

Fig. 1 is a vertical sectional view of an acid bottle in accordance with the instant invention; Fig. 2 is a cross-sectional view showing the float and magnet in plan, and Fig. 3 is a vertical sectional view through the float and magnet.

Fig. 4 is a side view showing the form of the line etched on the bottle.

Figs. 5 and 6 are detail views showing the preferred shape of the polar elements of the magnet, Fig. 5 showing the magnet within a spherical walled portion of a bottle.

Fig. 7 is a diagrammatic illustration of a bottle having means for raising the acid-oil interface after a deviation has been recorded.

Referring to the drawing, the acid bottle 12, which may be conveniently made of glass, is closed by a cap 15 and contains an etching liquid in its lower portion 26 and upon the etching liquid floats a layer of oil 27. A bar magnet 28 is secured in any suitable manner to the underside of a float 29 which may be of any suitable size and shape, provided that it is sufficient to maintain the magnet in the plane of the acid-oil interface 30. The magnet is provided with a protective covering 31 of a suitable substance such as ebonite preferably coated with gutta-percha to protect it from the corrosive action of the etching liquid. At one end of the magnet is a non-magnetic pole piece or member 32 which is also preferably of ebonite coated with gutta-percha or a similar caoutchouc-like substance which is water repellant and acid resistant, but is capable of being wetted by the oil. The member 32 may be globular as in Figs. 1, 2 and 3 or it may be of any desired shape. When the member 32 is propelled towards the side of the vessel, the film of oil adhering thereto slightly depresses the trace of the acid-oil interface 30 as shown at A in Fig. 5 and since the magnet is free to rotate in the acid bottle, the deformation in the line etched on the bottle by the etching liquid affords an indication of the directional deviation of the bore-hole from the vertical.

The other end of the magnet carries a larger non-magnetic pole piece or member 33 which is conveniently in the form of an annular segment having its centre of curvature at the centre of the magnet and presenting a broad surface to the side of the acid bottle of such dimensions as to cause the magnet to be propelled towards the side of the bottle adjacent the member 32.

The members 32 and 33 may conveniently be integral with the ebonite or like covering 31 by moulding the gutta-percha on the magnet, or the members may be separately attached to the magnet. The pole pieces 32 and 33 may be of the same or different materials, provided they are acid-resistant and provided that the pole piece 32 is also capable of being wetted by the oil.

Figs. 5 and 6 show pole pieces of modified shape designed to produce a more defined depression in the acid-oil interface. It will be seen that the pole pieces in this case are transversely ribbed or corrugated.

The ebonite pole pieces may be coated with a thin film of gutta-percha deposited from a carbon disulphide solution. The transverse ribs or furrows on the faces of the pole pieces resist the tendency of the etching liquid to creep up the gutta-percha coating of the ebonite pole piece, thus making a more defined depression in the acid-oil interface.

When the above-described instrument is employed in bore holes with a relatively large deviation from the vertical, the increase in the length of the major axis of the elliptical acid-oil interface may become too great to allow of sufficient repellant action between a cylindrical acid-bottle and the member 33 and in order to overcome this defect for large angles of deviation (such as might conceivably be encountered in bore holes in mines or in intentionally deviated holes) the cylindrical acid bottle may be replaced as shown in Fig. 5 by a bottle having a spherical portion 12a in which the acid-oil interface may be centrally or approximately centrally arranged, the members 32 and 33 being of convex form to approximate to the spherical inner surface of the bottle.

The instrument can also be adapted for recording deviations at two or more different levels. In a bore-hole in which the angle of deviation varies essentially at different depths, successive records may be recognized by changing the intensity of the etch at different depths. This may be effected by altering the time allowed for etching at the different depths. Alternatively, means may be provided for varying the level of the acid-oil interface after a deviation has been recorded at any predetermined depth. As an example of one manner of raising the level of the acid oil interface, reference is made to Fig. 7 which diagrammatically illustrates a bottle 12 provided with a yielding trap-door 34 in the bottom of a hollow stopper 15 containing lead shot 35, which can be admitted to the bottle through the trap-door 34 by so selecting the closing means for the trap-door that the door will yield and a number of the lead shot will fall into the bottle when the instrument is given a sudden pull upwards. By suitably designing the opening and trap-door therefor, the spring, and the size of the shot, several discharges of the shot in the vessel may be effected before the whole quantity is at the bottom of the vessel. Thereby two or more different levels of the etching liquid are obtained.

The term "water repellant" used above and in the claims refers to the repelling characteristics of the polar members to the etching liquid which is an aqueous solution of an acid, such as hydrofluoric acid.

I claim:

1. In a bore hole survey apparatus, a bottle, an etching liquid in said bottle, a magnetic needle floating upon the etching liquid within the bottle, means associated with the needle for producing local deformation of the surface edge of the etching liquid, and means for raising the surface level of the etching liquid by successive volumetric displacement while the bottle is in the bore hole.

2. A bore hole survey apparatus comprising, in combination, a glass vessel containing two immiscible liquids only one of which has etching properties, a magnetic needle, means for floating said needle in the liquid interface, a polar element attached to one end of said needle, adapted to produce a clearly defined local deformation of the edge of the liquid interface, and a member attached to the other end of said needle, adapted to be repelled away from the adjacent wall of the glass vessel, said member being of broad curved shape with its center of curvature near the center of the needle.

3. In a bore hole survey apparatus, a bottle, an etching liquid in said bottle, a magnetic needle floating upon the etching liquid within the bottle, and means associated with one pole of said needle adapted to produce a deformation in the surface edge of the etching liquid in the region of said pole.

4. In a bore hole survey apparatus of the character described, a polar element carried by one end of a magnetic needle suspended in the interface between two liquids one of which is an etching liquid and the other has no etching properties, said polar element being adapted to be more readily wetted by one of said liquids than by the other to produce a deformation in the edge of said interface in the region of said polar element.

5. An inclination recorder for use in bore holes comprising a container, an inclination indicating surface in said container, a liquid in said container in contact with said surface for effecting a marking record thereon of the inclination of the bore hole from the perpendicular, and means for changing the level of the liquid by successive volumetric displacements while the container is within the bore hole.

6. An inclination recorder of the acid bottle type for use in bore holes comprising a glass vessel, an etching liquid in said vessel, and means for changing the surface level of the etching liquid by successive volumetric displacements while the vessel is within the bore hole.

7. An inclination recorder of the acid bottle type for use in bore holes comprising a glass vessel, an etching liquid in said vessel, and means for raising the surface level of the etching liquid by successive volumetric displacements while the vessel is within the bore hole, said last-mentioned means comprising a hollow stopper for said vessel having a resiliently retained bottom therein, and solid elements resting on said bottom, adapted to be dropped into said vessel in successive increments by a jarring of the vessel to effect a volumetric displacement of the liquid therein.

8. In a bore hole survey apparatus, a vessel, a recording surface in said vessel, a liquid in said vessel for marking on said recording surface the inclination of the bore hole from the perpendicular, a direction indicating device adapted to assume a definite orientation with respect to the magnetic field of the earth, said device comprising a magnet, members repellent to said liquid in fixed relation to said magnet opposite each other, and buoyant means for floating said magnet and said members in said liquid, one of said members adapted to impel the other one into a recording position in relation to said recording surface, and the member impelled into a recording position being adapted to cause a deformation in the surface trace of said liquid on said recording surface to mark the orientation of said recording surface with respect to said device.

9. In a bore hole survey apparatus, an etchable member, an etching liquid cooperating with said member for marking thereon the deviation of the bore hole from the perpendicular, and means cooperating with said etching liquid for simultaneously recording the direction of the deviation by the same etching process.

10. A bore hole survey apparatus comprising a vessel, a recording surface in said vessel, a body of liquid in said vessel for effecting a marking record on said surface, a direction indicating device adapted to float in said liquid designed to assume a definite orientation with respect to the magnetic field of the earth comprising a magnet, members repellent to said liquid in fixed relation to said magnet opposite each other, one of said members adapted to cause a deformation in the surface trace of said liquid on said recording surface, and the other of said members adapted to impel said first-mentioned member into a recording position.

11. A bore hole survey apparatus comprising a container and an etchable surface therein, a body of acid in said container having its upper surface intersecting said etchable surface, a body of oil floating on said body of acid, a direction indicating device comprising a magnet assuming a definite orientation with respect to the magnetic field of the earth and adapted to float in said liquids in said container, members repellent to said acid in fixed relation to said magnet opposite each other, and buoyant means for supporting said magnet and members so that one of said members lies partly in the acid and partly in the oil, the other of said members being so designed as to impel said first-mentioned member closely adjacent said etchable surface in said container whereby the trace of the acid on the said etchable surface is deformed at that portion, to record the orientation of said etchable surface with respect to said direction indicating device.

12. A bore hole survey apparatus comprising a vessel, an etching liquid in said vessel adapted to produce an etched inclination indicating mark on the inside wall thereof, a supernatant liquid resting on said etching liquid, a direction indicating device adapted to float in said liquids, said device comprising a magnet and a member repellent to said etching liquid in fixed relation to said magnet, said member adapted to float partly within one liquid and partly within the other at the edge of the interface between said liquids and to produce a deformation in the trace of said interface to indicate the direction of inclination.

13. In a bore hole survey apparatus, a vessel, a liquid therein for recording on the interior thereof the trace of the upper surface of said liquid, a supernatant body of liquid of a different character resting on said liquid, a device comprising a magnet and two members repellent to said first liquid in fixed relation to said magnet and opposite each other, said device being suspended in the two liquids so that both of the members lie partly in one liquid and partly in the other intersecting the interface between the two liquids, and each member is repelled away from the inside wall of the vessel, one of said members being larger than the other to cause the device to be repelled further from the side of the vessel adjacent the larger of said members and to cause the second and smaller of said members to approach close to the side of the vessel adjacent it so as to produce a deformation of the trace of the interface at the respective wall portion, said deformation being also recorded on the interior of the vessel by said first liquid.

14. In a bore hole survey apparatus, a glass vessel, an etching liquid and a supernatant layer of oil in said vessel, a floating direction indicating device comprising a magnet and a member in fixed relation to said magnet adapted to float in said vessel and to intersect the interface between said etching liquid and oil, the surface of said member being adapted to be more easily wetted by the oil than by the etching liquid and adapted to cause local deformation of the edge of said interface.

15. In a bore hole survey apparatus, a glass vessel, two immiscible liquids therein, only one of which has etching properties, a magnet and a member attached thereto, means for floating said magnet and member, means for impelling said member towards the wall of said vessel, said member having a surface which is more easily wetted by one than by the other of the two liquids and positioned to float partly in one liquid and partly in the other, thus causing a local deformation in the trace of the interface between the two liquids, and means on said surface to resist the tendency of the etching liquid to creep along it and to thus preserve a maximum deformation in the trace of the liquid interface.

16. The combination claimed in claim 15 wherein said last-mentioned means comprises a series of horizontal grooves in the surface of said member.

17. In a bore hole survey apparatus, a vessel, a spherically shaped recording surface in said vessel, a liquid in said vessel in contact with said surface for marking on said recording surface the inclination of the bore hole from the perpendicular, a direction indicating device in said vessel adapted to assume a definite orientation with respect to the magnetic field of the earth, said device comprising a magnet, members repellent to said liquid in fixed relation to said magnet opposite each other, each of said members having a curved surface substantially parallel to the spherically shaped recording surface, and buoyant means for floating said magnet and members in said liquid, one of said members being adapted to impel the other one into a recording position in relation to said recording surface, and the member impelled into a recording position being adapted to cause a deformation in the surface trace of said liquid on said recording surface to mark the orientation of said recording surface with respect to said device.

WILLIAM ERNEST VICTOR ABRAHAM.